United States Patent [19]
Yoshimura

[11] Patent Number: 5,560,796
[45] Date of Patent: Oct. 1, 1996

[54] TRANSFER SHEET

[75] Inventor: Yasuyuki Yoshimura, Ibaraki, Japan

[73] Assignee: Sakura Color Products Corporation, Osaka, Japan

[21] Appl. No.: 359,645

[22] Filed: Dec. 20, 1994

[30]     Foreign Application Priority Data

Dec. 27, 1993 [JP] Japan .................................. 5-331227

[51] Int. Cl.⁶ ..................................................... B41M 7/00
[52] U.S. Cl. ........................ 156/240; 428/195; 428/352; 428/354; 428/355; 428/447; 428/500; 428/913; 428/914; 503/201; 503/226
[58] Field of Search .................................. 428/195, 913, 428/914, 500, 343, 352, 354, 355, 447; 503/201, 216, 217, 225; 156/230, 239, 240

[56]      References Cited

U.S. PATENT DOCUMENTS

| | | | |
|---|---|---|---|
| 3,907,974 | 9/1975 | Smith | 428/346 |
| 4,454,179 | 6/1984 | Bennett et al. | 428/41 |
| 4,640,727 | 2/1987 | Janssen | 156/240 |
| 5,284,688 | 2/1994 | Hiatt | 428/40 |

*Primary Examiner*—Bruce H. Hess
*Attorney, Agent, or Firm*—Larson and Taylor

[57]     ABSTRACT

The present invention provides a transfer sheet comprising a releasable base and, as disposed successively thereon, at least one picture printing layer, a UV-curing adhesive layer and a release layer and a transfer process employing a transfer sheet which comprises peeling off the releasable base from the sheet, transferring the printing layer and UV-curing adhesive layer as a unit to a substrate and curing the adhesive layer by UV irradiation.

18 Claims, 2 Drawing Sheets

TRANSFER SHEET

TECHNICAL FIELD

The present invention relates to a transfer sheet. The transfer sheet of the invention is particularly useful in design transfer or decalcomania for decorating ceramics (mugs, tea cups, etc.), glassware (cups, bowls, etc.), metal ware (key holders, containers, etc.), plastic articles (cups, toys, etc.) and so on with patterns.

Throughout the specification, "%" and "parts" are "weight %" and "parts by weight", respectively.

BACKGROUND ART

In the transfer of a design or picture to the surface of a ceramic article or like base product, it is common practice to use a water slide technique. According to the technique, a water-soluble size or paste layer is first formed on a release paper, a multicolor picture layer is formed thereon and, where necessary, a picture-supporting layer is further disposed on the picture layer to provide a transfer sheet. In transfer printing, the thus-obtained transfer sheet is wetted with water to dissolve out the water-soluble size and, hence, let the picture layer leave from the release sheet, whereupon the picture layer is slide-transferred to the surface of a ceramic or other substrate. Then, using a squeegee and like tools, water between the picture layer and the substrate ware is squeezed out. The substrate ware is allowed to stand for drying the picture layer. After completion of drying, the ware is calcined at as high as about 1000° C. to permanently fix the design or picture thereto.

However, this technique has the disadvantage that since a step for high-temperature calcining at about 1000° C. is essential, the use of heat-labile coloring materials, which are rich in colors, color tones, etc., is limited. Further, because the squeegee and like tools are essentially used in the technique, the manual labor of skillful operator is required, thereby increasing the production costs.

Japanese Unexamined Patent Publication 252,600/1990 discloses "a transfer sheet comprising a release paper or film base carrying thereon a water-soluble size or releaser, a supporting layer disposed on said base and capable of maintaining the shape of a picture layer to be transferred and, as formed thereon, a picture layer comprising a printing layer selected having a B stage so as to insure a greater bond strength with respect to a substrate ware than the bond strength to said supporting layer" and a transfer process employing said transfer sheet.

In the process, calcining or curing the printing layer is performed at a temperature of 80°–300° C. and, therefore, the above-mentioned problem associated with high-temperature calcination is overcome. However, when the process is applied to multicolor decalcomania, it takes a long time for the printing layer to establish the B stage, with the result that the efficiency of production of the transfer sheet is inevitably low.

Furthermore, when the printing layer is calcined at a relatively low temperature of 80°–170° C., a sufficient degree of cure can be achieved only after prolonged heating leading to an inadequate adhesion of the printing layer to the substrate ware. There also is the disadvantage that the water resistance of the picture to water, in particular, to warm water is low.

It is a primary object of the invention to provide a novel transfer sheet which permits the use of heat-labile coloring materials and enables multicolor decalcomania at a comparatively low temperature without procedural complexity.

It is a further object of the invention to provide a novel transfer process which affords multicolor decalcomania at a comparatively low temperature without procedural complexity.

Other objects and advantages of the invention will become apparent in view of the following description.

SUMMARY OF THE INVENTION

The inventors have conducted research in view of the foregoing state of the prior art and found that when a ultraviolet (UV)-curing adhesive is used as a bonding material for bonding a printing layer and a substrate, the problems of the prior art are substantially eliminated or drastically alleviated.

Thus, the invention provides the following transfer sheets and transfer processes.

1. A transfer sheet comprising a releasable base and, as disposed successively thereon, at least one picture printing layer, a UV-curing adhesive layer and a release layer.
2. A transfer sheet of item 1 wherein the film-forming component of said picture printing layer comprises an UV-curing resin.
3. A transfer sheet of item 1 or 2 wherein said picture printing layer comprises a non-variable color layer.
4. A transfer sheet of item 1 or 2 wherein said picture printing layer comprises a reversible thermochromic layer.
5. A transfer sheet of item 1 or 2 wherein said picture printing layer comprises a non-variable color layer and a reversible thermochromic layer.
6. A transfer sheet of any of items 1 to 5 wherein said picture printing layer contains a silane coupling agent.
7. A process of transfer printing using said transfer sheet as defined in any one of items 1 to 6, the process comprising peeling off the releasable base from said sheet, transferring said picture printing layer and UV-curing adhesive layer as a unit to a substrate ware, and curing said adhesive layer by UV irradiation.
8. A process of item 7 wherein the substrate is pretreated with a silane coupling agent.
9. A process of item 7 wherein said picture printing layer contains a silane coupling agent.

DETAILED DESCRIPTION OF THE INVENTION

A. Releasable base

The releasable base (hereinafter referred to briefly as the base) of the invention can be a paper or a film made of polyethylene, polypropylene, polyethylene terephthalate, polyvinyl chloride, polybutene, polybutadiene, polyurethane, polymethylpentene, ethylenevinyl acetate copolymer and other films, on which a known release material such as acrylic, silicone, vinyl, polyester, urethane, polyolefin and other release materials are coated. Among the release materials mentioned above, acrylic release materials with Tg values of not below 100° C. are more preferable. A thickness of the base, is not limited to but, generally ranges from about 25 to about 125 μm.

B. Printing Layer

The printing layer on the base is formed by printing the base with a known UV-curing ink, oil based ink, cold setting ink, reversible thermochromic ink or the like according to screen printing, offset printing or other technique, followed by subjecting the printing layer to ultraviolet irradiation, drying or the like according to the properties of the ink.

A resin component of the UV-curing ink is not particularly limited but includes the following.

Photopolymerizable prepolymers and polymers such as polyether (meth)acrylate, urethane (meth)acrylate, epoxy (meth)acrylate, polyester (meth)acrylate, oligo (meth)acrylate, alkyd (meth)acrylate, polyol (meth) acrylate, etc. These photopolymerizable prepolymers and polymers have a molecular weight of about 500 to about 50,000. They are usable alone or in combination.

Mono/polyfunctional reactive monomers such as 2-ethylhexyl acrylate, 2-hydroxyethyl acrylate, 2-hydroxypropyl acrylate, 2-hydroxyethyl acryloyl phosphate, tetrahydrofurfuryl acrylate, acrylate of tetrahydrofurfuryl derivative, dicyclopentenyl acrylate, dicyclopentenyloxyethyl, 1,3-butanediol diacrylate, 1,4-butanediol diacrylate, 1,6-hexanediol diacrylate, diethylene glycol diacrylate, neopentyl glycol diacrylate, polyethylene glycol 400 diacrylate, hydroxypivalic acid ester neopentyl glycol diacrylate, tripropylene glycol diacrylate, 1,3-bis(3"-acryloxyethoxy-2'-hydroxypropyl)- 5,5-dimethylhydantoin, diacrylate of hydroxypivalic acid ester neopentyl glycol derivative, trimethylolpropane triacrylate, pentaerythritol triacrylate, pentaerythritol hexacrylate, etc.

Photopolymerization initiators such as biacetyl, acetophenone, benzophenone, Michler's ketone, benzyl, benzoin, benzoin isobutyl ether, benzyl methyl ketal, tetramethylthiuram sulfide, azobisisobutyronitrile, benzoyl peroxide, di-tert-butyl peroxide, 1-hydroxycyclohexyl phenyl ketone, 2-hydroxy-2-methyl-1-phenylpropan-1-one, 1-(4-isopropylphenyl)- 2-hydroxy-2-methylpropan-1-one, 2-chlorothioxanthone, methylbenzoyl formate, etc.

The coloring material may be any of the known inorganic pigments, organic pigments and thermochromic pigments, for instance.

The UV-curing ink is preferably a composition comprising (a) 20–90 parts by weight of at least one member selected from the group consisting of urethane (meth)acrylates in the molecular weight range of about 500–50000 and polyester (meth)acrylates in the molecular weight range of about 500–50000, (b) 80–10 parts by weight of at least one mono/polyfunctional reactive monomer, and based on the above total of 100 parts by weight, (c) 1–15 parts by weight of at least one photopolymerization initiator selected from the group consisting of acetophenone, benzophenone and thioxanthone type initiators. Said composition preferably contains 60–95 weight % of (a), (b) and (c) combined and 40–5 weight % of a pigment component.

The UV-curing ink may further contain, in addition to the above resin component and coloring material (inorganic pigment, organic pigment, thermochromic or other pigment), such other additives as a sensitizer, filler, inert organic polymer, leveling agent, thixotropic agent, thermopolymerization inhibitor, solvent and so on.

The oil based ink essentially comprises an evaporation-drying type resin component showing a good bonding affinity for the substrate, such as an acrylic, epoxy, urethane or other resins, a solvent component such as an aliphatic hydrocarbons, aromatic hydrocarbons, alcohols, glycols, ketones, esters or ethers, and a coloring material such as an inorganic pigment, organic pigment, thermochromic pigment, etc.

The cold setting ink essentially comprises a resin system containing a base resin and a curing agent, and a coloring material (an inorganic pigment, organic pigment, thermochromic pigment, etc.). In addition, the ink may contain a cure accelerator, curing catalyst, reactive diluent and stabilizer, etc., where necessary. The combination of the base resin and the curing agent in cold setting ink is not particularly limited to but includes the following, for instance.

* Base resin—epoxy resins and modified epoxy resins

Curing agent—aliphatic amines, alicyclic amines, aromatic amines, polyamides, amine adducts, polysulfides, acid anhydrides, etc.

* Base resin—acrylic resins and modified acrylic resins

Curing agent—divalent and multivalent metals, metal oxides, etc.

* Base resin—urethane resins and modified urethane resins

Curing agent—polyamines, polycarboxylic acids, hydroxy-terminated polyesters

In the invention, known reversible thermochromic ink compositions can be used to print on the substrate or in superposition on the printing layer formed with the above-mentioned ink. The reversible thermochromic ink composition comprises an electron-donating chromogenic organic compound (color producing agent), an electron-accepting compound (developer) and a desensitizer, and such compositions are described in a variety of publications. The species of such a color producing agent, developer and desensitizer constituting reversible thermochromic compositions are not limited to, but those mentioned in Japanese Unexamined Patent Publication 174,591/1989 are useful. Such compositions may have been microencapsulated.

If necessary, a silane coupling agent may be incorporated in any of the above inks so as to enhance bond strength between the picture layer and the substrate. The same object can also be accomplished by dipping the substrate in an aqueous solution of the silane coupling agent. The silane coupling agent includes epoxysilanes, aminosilanes, vinylsilanes, acrylsilanes, γ-chloropropyltrimethoxysilanes etc. Epoxysilane and aminosilane type coupling agents are preferred. The silane coupling agent is formulated preferably about 0.05–10%, more preferably about 1–5% relative to a weight of the ink.

C. UV-Curing Adhesive Layer

The UV-curing adhesive layer according to the invention is provided using a UV-curing adhesive composition essentially comprising about 0.1–15 parts of a crosslinking or curing agent (hereinafter referred to as the crosslinking agent) and about 10–70 parts of a UV-curing resin per 100 parts of an alkyl (meth)acrylate polymer.

The number of carbon atoms in the alkyl ester moiety of said alkyl (meth)acrylate polymer may range from 1 to 14. If the carbon number exceeds 14, no sufficient adhesion can be obtained due to glass transition temperature (Tg). The carbon number of the alkyl ester moiety is preferably 4–12. From the standpoint of adhesion and heat resistance, the molecular weight of said alkyl (meth)acrylate polymer is generally about $3 \times 10^5$ to $1 \times 10^6$, preferably about $4 \times 10^5$ to $1\times10^6$. Examples of the alkyl (meth)acrylate polymer are butyl (meth)acrylate polymer and 2-ethylhexyl (meth)acrylate polymer.

The crosslinking agent present in the UV-curing adhesive composition of the invention undergoes crosslinking reaction with the hydroxyl and carboxyl groups of said polymer and α,β-unsaturated carboxylic acid to enhance and stabilize adhesion and cohesive force of the composition. The crosslinking agent includes isocyanate, epoxy, metal and N-methylol type crosslinking agents. Particularly preferred are isocyanate type crosslinking agents such as tolylene diisocyanate, xylylene diisocyanate, hexamethylene diisocyanate, isopropylene diisocyanate, trimethylhexamethylene diisocyanate, isophorone diisocyanate and so on. Said crosslinking agent is formulated in an amount of about 0.1–0.5%, preferably about 0.5–3%, based on the weight of the polymer or the total weight of the polymer and α,β-unsaturated carboxylic acid as nonvolatile matter. If the amount of the crosslinking agent is too small, no sufficient cohesive force will be attained. On the other hand, with an excessive amount of the crosslinking agent, the adhesion thereof is decreased.

The adhesive composition may contain, if necessary, an α,β-unsaturated carboxylic acid in lieu of part of said polymer (up to about 15%), in which case adhesion and tackiness of the composition are improved. The α,β-unsaturated carboxylic acid includes (meth)acrylic acid, itaconic acid, maleic acid and fumaric acid, etc.

The UV-curing resin incorporated in the UV-curing adhesive composition of the invention undergoes crosslinking reaction, on exposure to UV irradiation, with the hydroxyl and carboxyl groups of the alkyl (meth)acrylate polymer, α,β-unsaturated carboxylic acid and resin component of said ink to provide a firm bond with the substrate ware.

The UV-curing resin is prepared using about 0.3 to about 20 parts, preferably about 0.5 to about 10 parts, of a photopolymerization initiator (hereinafter simply referred to as "initiator") per 100 parts of the photopolymerizable prepolymer (and/or photopolymerizable polymer, hereinafter simply referred to as "photopolymerizable prepolymer" unless specifically indicated) or 100 parts of the total of the photopolymerizable prepolymer and photopolymerizable monomer.

Examples of the photopolymerizable prepolymer are polyether (meth)acrylate, urethane (meth)acrylate, epoxy (meth)acrylate, polyester (meth)acrylate, alkyd (meth)acrylate, etc. At least one of these polymers can be used. Among them, polyester (meth)acrylate, epoxy (meth)acrylate, urethane (meth)acrylate and the like are preferred. The photopolymerizable prepolymers have a molecular weight which is not specifically limited but is in the range of about 500 to about 150,000. They are usable alone or in combination.

A photopolymerizable monomer is employable, for example, to impart the properties such as flexibility, heat resistance, etc. or to adjust the viscosity. Examples of such photopolymerizable monomers are 2-ethylhexyl (meth)acrylate, 2-hydroxyethyl (meth)acrylate, 2-hydroxy (meth)acryloyl phosphate, tetrahydrofurfuryl (meth)acrylate, (meth)acrylate of tetrafurfuryl derivative, dicyclopentenyl (meth)acrylate, dicyclopentenyloxyethyl (meth)acrylate, 1,3-butanediol (meth)acrylate, 1,4-butanediol (meth)acrylate, 1,6-hexanediol di(meth)acrylate, diethylene glycol (meth)acrylate, neopentyl glycol di(meth)acrylate, polyethylene glycol 400 di(meth)acrylate, hydroxypivalic acid ester neopentyl glycol di(meth)acrylate, tripropylene glycol di(meth)acrylate, trimethylolpropane tri(meth)acrylate, pentaerythritol tri(meth)acrylate, dipentaerythritol hexane(meth)acrylate, etc. At least one of them is used in this invention. The photopolymerizable monomer to be mixed with the photopolymerizable prepolymer is used in an amount not exceeding 80% based on the weight of the mixture.

Useful polymerization initiators include, for example, radical polymerization initiators such as acetophenones, benzoimines, benzophenones, thioxanthones, amines and the like and cationic polymerization initiators such as iron-allen complex, diphenylsulfide derivatives, etc. Among them, preferred are acetophenones and thioxanthones. The amount of the initiator used is about 0.3 to about 20 parts, preferably about 0.5 to about 10 parts, per 100 parts of the photopolymerizable prepolymer or 100 parts of the combined amount of the photopolymerizable prepolymer and the photopolymerizable monomer. When an excess amount of the initiator is used, only the surface of the adhesive layer is cured due to self absorption. On the other hand, a lesser amount of initiator used results in the reduction of curability.

When required, the UV-curing resin may contain known additives such as sensitizers, oxidation inhibitors, polymerization inhibitors, fillers, etc.

Useful sensitizers include, for example, amines such as aliphatic amines, aromatic group-containing amines, etc.; urea compounds such as allylurea, o-tolylthiourea, etc.; sulfur-containing compounds such as sodium diethyl dithiophosphate, soluble salt of aromatic sulfinic acid, etc.; N,N-di-substituted (R1, R2)-p-aminobenzonitrile compounds (wherein R1 and R2 are the same or different and each is a methyl group, an ethyl group, a β-cyanoethyl group, a β-chloroethyl group or the like); phosphorus compounds such as tri-n-butylphosphine, sodium diethyl dithiophosphate, etc.; nitrogen-containing compounds such as oxazoline compounds, N-nitrosohydroxylamine derivatives, Michler's ketone, etc.; chlorine-containing compounds such as carbon tetrachloride, hexachloroethane, etc.

Useful polymerization inhibitors include, for example, hydroquinone, hydroquinone monomethyl ether, etc.

Useful oxidation inhibitors include, for example, phenols, aromatic amines, organic sulfur compounds, etc.

Useful fillers include, for example, calcium carbonate, magnesium carbonate, silicate, etc.

The amount of the UV-curing resin used is about 10 to about 70%, preferably about 30 to about 60%, based on the weight of alkyl (meth)acrylate polymer or the combined weight of alkyl (meth)acrylate polymer and α,β-unsaturated carboxylic acid. A lesser amount of the UV-curing resin fails to achieve satisfactory improvement of the adhesion.

The UV-curing adhesive composition used in the invention may contain, when required, vinyl monomers for further increasing the adhesion and cohesive force of the composition. Examples of useful vinyl monomers are alkyl (meth)acrylate of 1 to 14 carbon atoms such as methyl (meth)acrylate, ethyl (meth)acrylate, isopropyl (meth)acrylate, 2-ethylhexyl (meth)acrylate, etc.; hydroxyl-containing unsaturated monomers such as 2-hydroxyethyl (meth)acrylate, 2-hydroxypropyl (meth)acrylate, diethylene glycol monoacrylate, etc.; styrene monomers such as styrene, vinyltoluene, chlorostyrene, etc.; carboxyl-containing unsaturated acids such as acrylic acid, methacrylic acid, itaconic acid, maleic acid, etc.; other ethylenically unsaturated monomers such as vinyl acetate, etc.; and unsaturated monomers containing a functional group such as an amino group, a glycidyl group or the like, etc. The amount of the vinyl monomer used is up to 60%, preferably about 10 to about 60%, based on the weight of alkyl (meth)acrylate polymer or the combined weight of alkyl (meth)acrylate polymer and α,β-unsaturated carboxylic acid.

To enhance the adhesion, cohesive force and heat resistance of the composition, the UV-curing adhesive composition used in the invention may contain rosin-type resin, terpene resin, aliphatic petroleum resin, aromatic petroleum resin, alicyclic petroleum resin, cumarone resin, styrene resin, alkylphenol resin, xylene resin, etc. which have Tg values of not lower than 80° C. The amount of the resin used is up to 150%, preferably about 10 to about 150% based on the weight of alkyl (meth)acrylate polymer or the combined weight of alkyl (meth)acrylate polymer and $\alpha,\beta$-unsaturated carboxylic acid.

The UV-curing adhesive composition to be used in the invention is applied usually as a solution in an organic solvent to the surface of the picture printing layer. Useful solvents are, for example, ketones such as acetone, diethyl ketone, cyclohexane, etc.; esters such as methyl acetate, ethyl acetate, butyl acetate, etc.; ethers such as ethylene glycol monomethyl ether, etc.; aromatic hydrocarbons such as benzene, toluene, xylene, etc.; and aliphatic hydrocarbons such as hexene, heptane, etc. At least one of them is used in the invention. The concentration of the UV-curing adhesive composition in the solution is properly adjusted according to the intended use but are not specifically limited.

The construction of the transfer sheet of the invention and the process for its manufacture are now described in detail with reference to the drawings.

Figure 1:
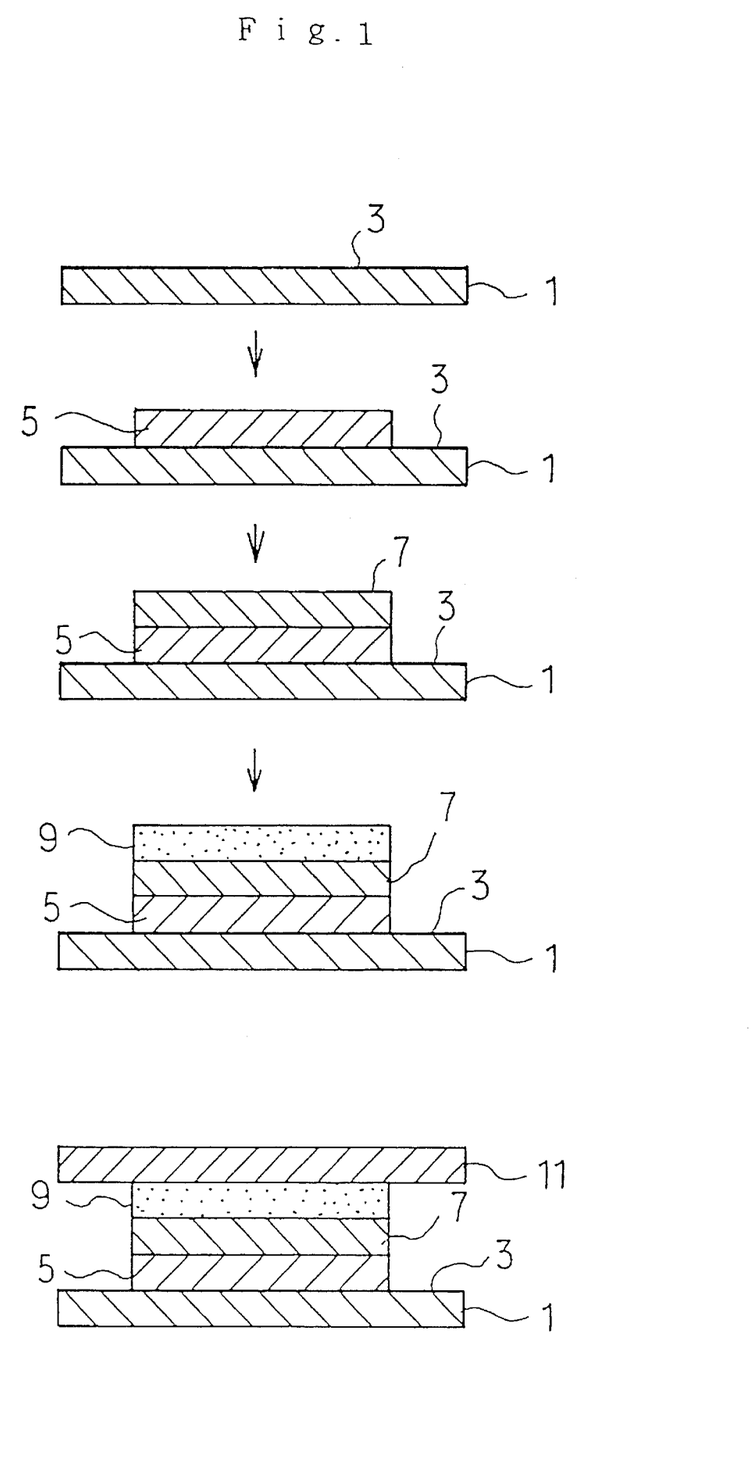
FIG. 1 is a schematic sectional view illustrating a process for manufacture of the transfer sheet according to the invention and an exemplary construction of said sheet.

As shown in sectional view in FIG. 1, a base 1 is coated with a release composition in the conventional manner (screen printing, coating, etc.) and the solvent is evaporated to form a release layer 3. The evaporation of the solvent can be carried out, but is not limited to, by air-drying (about 10–30 minutes at room temperature), forced drying (e.g. about 1–5 minutes at 60° C.), etc.

Then, a plurality of picture patterns are reverse-printed on the release layer 3 by the conventional technique (screen printing, offset printing, etc.) and subjected to ultraviolet irradiation or thermal drying according to the type of resin component in the ink used, whereby the resin component is cured to give picture printing layers 5, 7. The number of picture printing layers can be selected according to the desired design.

Thereafter, said UV-curing adhesive composition is coated on the picture printing layer 7 in the conventional manner (e.g. screen printing, offset printing, etc.), by evaporating off the solvent, followed by applying a release sheet 11 on the picture printing layer 7 to form a UV-curing adhesive layer 9. The release sheet is not limited to in type but the conventional sheet-releaser assemblies can be utilized. The conditions for evaporation of the solvent can also be freely selected according to the type of solvent but may, for example, be about 1–5 minutes at 80° C.

Figure 2:
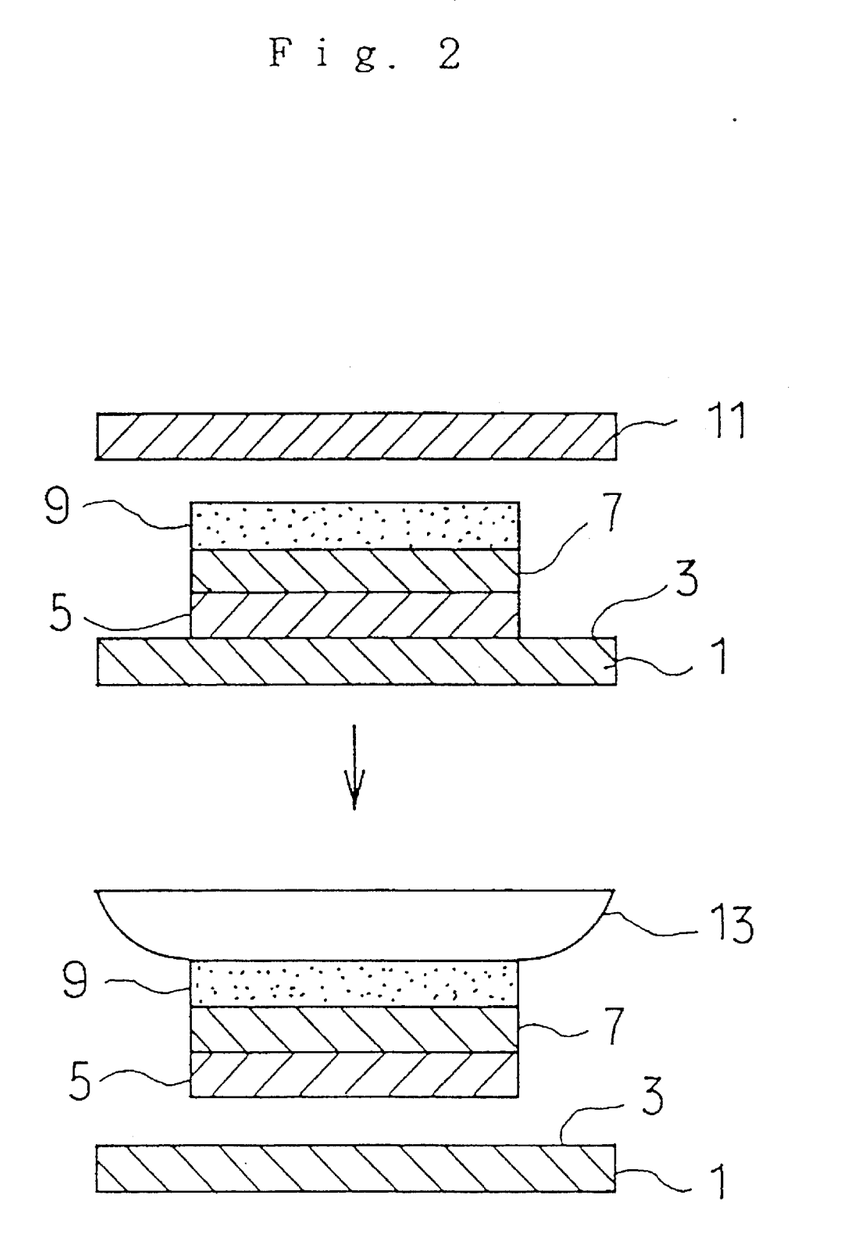
FIG. 2 is a schematic sectional view showing a manner of use of the transfer sheet according to the invention.

In use, the thus-obtained transfer sheet is punched and half-cut to provide a necessary picture. As shown in FIG. 2, the release sheet 11 is then peeled off and the UV-curing adhesive layer 9 is applied to a substrate ware 13. Thereafter, the base 1 is peeled off and the ware 13 is subjected to UV irradiation to cure the UV-curing adhesive layer 9, whereby the picture is firmly fixed to the ware. The curing procedure can be carried out in the conventional manner using a known UV irradiation device and the curing conditions are not specifically limited. The curing is complete in about 2 to about 10 seconds.

In the invention, ultrafine titanium oxide, an ultraviolet absorber or the like may be incorporated in the picture printing layer and/or releaser layer in the per se known manner, whereby photoresistance of the transfer sheet and of the picture layer can be enhanced.

The following significant effects can be realized according to the invention.

(1) Since immersion in water of the transfer sheet and the subsequent application to the substrate with a squeegee are not needed, a remarkable improvement in workability is realized so that the picture formation of the substrate ware can be mechanized.

(2) Since the picture layer in B to C stage is formed in a short time, multicolor decalcomania can be easily accomplished and the workability is also improved.

(3) Unlike the conventional technology using known adhesives, the UV-curing adhesive layer according to the invention is not temperature-dependent so that there occurs no such a trouble as displacement or detachment of the picture layer in use of the ware.

(4) Since the UV-curing adhesive layer is cured at room temperature in a short time (usually up to 10 seconds), a high work efficiency can be obtained.

(5) Since the picture layer formed shows good adhesion to the substrate ware, it is remarkably durable even in the presence of water or warm water.

(6) The picture formed on the ware has a satisfactory gloss adding much to the marketability of the product ware.

(7) Since there is no blocking, the transfer sheet has a long shelf-life.

(8) When a silane coupling agent is incorporated in the UV-curing adhesive layer, or a substrate ware is pretreated with a silane coupling agent, a further improvement is insured in the adhesion to the substrate ware.

(9) Known water transfer processes were compared with the process of the present invention in respect of the process starting from the preparation of a transfer sheet until the formation of a picture printing layer on the substrate ware. The results of comparison are shown below in Table 1. It is apparent that a significant improvement in production efficiency is insured in the present invention.

| Water Transfer Process | Present Invention |
| --- | --- |
| 1. Printing | |
| Manually printed one by one. A cold setting, water-soluble size or paste composition is applied to a release sheet and dried for 1 hour or more. | A roll of sheets is continuously printable. A UV-curing adhesive composition is applied to continuous sheet and dried for a few seconds. |
| 2. Transfer | |
| After immersion in water, the design is transferred by a squeegee. Manual operation is limited to one capable of operating on about 700 articles a day. | The design is automatically transferable. E.g. one autolabeller can transfer designs on 24,000 articles a day. |
| 3. Fixation | |
| The article is heated at 140° C. for 30 minutes for drying. one dryer can achieve fixation about 4,000 articles a day. | Fixation is complete in a few seconds, namely is feasible with efficiency comparable to or higher than that of transfer operation. |

EXAMPLES AND COMPARATIVE EXAMPLES

The following examples and comparative examples are intended to further illustrate the outstanding features of the invention in detail.

The releasable base and UV-curing adhesive compositions used in the examples and comparative examples were as follows.

I. Releasable base

An acrylic release composition was deposited on a 100 μm-thick clear PET film by screen printing and dried at room temperature to provide a releasable base.

II. Components of the UV-curing adhesive compositions (the materials other than those shown below are specifically described in the respective examples).

Acrylic ester copolymer (hereinafter "polyacrylate")

Polyacrylate 1 ... "SK Dyne 1313" (trade mark), product of Soken Kagaku K.K., nonvolatile matter= 30%;

Polyacrylate 2 ... "Nissetsu" (trade mark), product of Nippon Carbide Industries Co., Inc., nonvolatile matter= 40%;

Polyacrylate 3 ... "SK Dyne 100" (trade mark), product of Soken Kagaku K.K., self-curing type, nonvolatile matter= 40%;

Polyacrylate 4 ... "Haipon 9940" (trade mark), product of Hitachi Kasei Polymer Co., Inc., EVA hot melt type.

Photopolymerizable prepolymer (hereinafter "prepolymer")

Prepolymer 1 ... "M-1100" (trade mark), product of Toa Gosei Kagaku K.K., polyurethane acrylate, molecular weight= about 2,000;

Prepolymer 2 ... "M-7100" (trade mark), product of Toa Gosei Kagaku K.K., polyester acrylate, molecular weight= about 1,000;

Prepolymer 3 ... "AR-G" (trade mark), product of San Pou Kagaku Kenkyu Sho, polyepoxy acrylate, molecular weight= about 120,000.

Photopolymerizable monomer (hereinafter "monomer")

Monomer 1 ... "KS-HDDA" (trade mark), product of Nippon Kayaku Co., Ltd., difunctional monomer;

Monomer 2 ... "R564" (trade mark), product of Nippon Kayaku Co., Ltd., monofunctional monomer Photopolymerizaton initiator "Darocur 1173" (trade mark), product of Merck & Co., Inc., acetophenone type, photosensitizer Photosensitizer "KAKURE DMBI" (trade mark), product of Nippon Kayaku Co., Ltd., 4-dimethylaminoisoamyl benzoate.

Crosslinking agent

Crosslinking agent ... "L-45" (trade mark), product of Soken Kagaku K.K., TDI-TMP adduct (nonvolatile matter= 45%).

Silane coupling agent

Silane coupling agent ... "KBM 703" (trade mark), product of Shin-etsu Kagaku K.K., chloropropyl methoxysilane.

Coloring pigment

Coloring pigment 1 ... "820 Series Green" (trade mark), product of Sterling Industrial Colors Ltd., organic pigment;

Coloring pigment 2 ... "820 Series Pink" (trade mark), product of Sterling Industrial Colors Ltd., organic pigment;

Coloring pigment 3 ... "TC Powder Black 45" (trade mark), product of Sakura Color Products Co., thermochromic pigment;

Coloring pigment 4 ... "TC Powder Blue 15" (trade mark), product of Sakura Color Products Co., thermochromic pigment.

EXAMPLE 1

Using an ink composition of the following formulation, a polka dot pattern was formed on a releasable base by screen reverse printing, followed by ultraviolet irradiation to form a design.

| | |
|---|---|
| Polyester acrylate (product of Toa Gosei Kagaku K.K., "Aronix M-700" (trade mark), molecular weight = about 1000) | 70.2 parts |
| 1,6-hexanediol diacrylate | 17.1 parts |
| Acetophenone photopolymerization initiator (product of Ciba-Geigy, "Irgacure 651" (trade mark)) | 1.8 parts |
| Thioxanthone photopolymerization initiator (product of Nippon Kayaku Co., Ltd., "Kayacure DETX" (trade mark)) | 0.9 parts |
| Coloring pigment 1 | 10.0 parts |

Using an applicator, a UV-curing adhesive composition was coated in a thickness of 20 μm on the above design and dried at 80° C. for 5 minutes. A release sheet was superimposed thereon to provide a transfer sheet.

| | |
|---|---|
| Polyacrylate 1 | 90 parts |
| Prepolymer 1 | 8 parts |
| Monomer 1 | 2 parts |
| Photopolymerization initiator | 0.1 part |
| Photosensitizer | 0.1 part |
| Crosslinking agent | 1.6 parts |

The release sheet was peeled off from the transfer sheet thus obtained and the design was transferred to a ceramic substrate mug in a manner to bring the UV-curing adhesive layer into contact with the surface of the substrate mug. After the releasable base was peeled off, the mug was irradiated with ultraviolet rays using a metal halide lamp (80 W/cm$^2$).

The thus-obtained mug carrying a polka dot pattern was excellent in bond strength and warm water resistance of the design as evidenced in Test Example 1 which appears hereinafter.

In the process as described above, the time taken from the production of transfer sheet until the formation of picture pattern on the substrate mug was made markedly shorter than the time from the production of conventional thermosetting transfer sheets to the formation of picture pattern by the water transfer process.

Moreover, when the transfer sheet according to the example was stored for a long term, it posed no problem.

COMPARATIVE EXAMPLE 1

A transfer sheet was manufactured in the same manner as Example 1 except that polyacrylate 4 was used as the adhesive, and using a silicone rubber, the transfer sheet was stuck to a substrate mug by a thermal transfer process.

The transferred polka dot pattern showed a good bond strength with respect to the mug but was poor in resistance to warm water.

COMPARATIVE EXAMPLE 2

A transfer sheet was manufactured in the same manner as Example 1 except that the following composition was used as the UV-curing adhesive composition and the design was transferred to a substrate mug by UV irradiation.

| Polyacrylate 3 | 90 parts |
| --- | --- |
| Prepolymer 1 | 8 parts |
| Monomer 2 | 2 parts |
| Photopolymerization initiator | 0.1 part |
| Photosensitizer | 0.1 part |
| Crosslinking agent | 1.6 parts |

The transferred polka dot pattern showed a good bond strength with respect to the mug but was poor in resistance to warm water.

COMPARATIVE EXAMPLE 3

A transfer sheet was manufactured in the same manner as Example 1 except that the following adhesive composition was used and the design was transferred to a substrate mug by a thermal transfer process.

| Polyacrylate 1 | 100 parts |
| --- | --- |
| Crosslinking agent | 1.6 parts |

The transferred polka dot pattern showed a good bond strength with respect to the mug but was poor in resistance to warm water.

COMPARATIVE EXAMPLE 4

A transfer sheet was manufactured in the same manner as Example 1 except that the following UV-curing adhesive composition was used and the design was transferred to a substrate mug.

| Polyacrylate 1 | 80 parts |
| --- | --- |
| Prepolymer 1 | 16 parts |
| Photopolymerization initiator | 0.2 part |
| Photosensitizer | 0.2 part |
| Crosslinking agent | 1.6 parts |

The transferred polka dot pattern was unsatisfactory in bond strength and resistance to warm water.

EXAMPLE 2

An ink composition was prepared by mixing together with stirring 100 parts of a UV-curing medium (trade mark "RIG Medium", product of Seiko Advance Co., Ltd., urethane acrylate type), 10 parts of a coloring pigment 1 and 20 parts of coloring pigment 3. A polka dot pattern was printed on a releasable base by screen reverse printing, followed by ultraviolet irradiation to form a design.

Then, using an applicator, a UV-curing adhesive composition of the following formulation was coated in a thickness of 20 μm on the above design, and dried at 80° C. for 5 minutes. A release sheet was superimposed thereon to provide a transfer sheet.

| Polyacrylate 1 | 90 parts |
| --- | --- |
| Prepolymer 2 | 7 parts |
| Monomer 1 | 3 parts |
| Photopolymerization initiator | 0.15 parts |
| Photosensitizer | 0.15 parts |
| Crosslinking agent | 1.7 parts |
| Silane coupling agent | 2.0 parts |

The release sheet was peeled off from the transfer sheet and the design was transferred to a ceramic substrate mug in a manner to bring the UV-curing adhesive layer into contact with the surface of the substrate mug. After the releasable base was peeled off, the mug was irradiated with ultraviolet rays using a metal halide lamp (80 W/cm$^2$).

The resultant mug carrying a polka dot pattern was excellent in bond strength of the pattern to the substrate mug as well as the resistance thereof to warm water as clear from the results of Test Example 1 to be described later.

The thus-obtained mug carrying a polka dot pattern was black at room temperature but when it was filled with warm water, the pattern turned brilliant fluorescent green.

The transfer sheet obtained in the example showed no problem, even after prolonged storage.

EXAMPLE 3

One-hundred parts of an epoxy resin ("Epikote 828" (trade mark), product of Yuka Shell Epoxy K.K.), 5 parts of a reactive diluent ("Cardura" (trade mark), product of Yuka Shell Epoxy K.K.), 0.5 part of a defoaming agent ("BYK-077" (trade mark), product of BYK Chemie Japan) and 40 parts of coloring pigment 1 were mixed under stirring, followed by adding 25 parts of a curing agent ("Epicure U" (trade mark), product of Yuka Shell Epoxy K.K.) and mixing to provide an ink composition.

Using the ink composition, a polka dot pattern was formed on a releasable base by screen reverse printing. The design cured at room temperature for fixation.

Then, the UV-curing adhesive composition of the following formulation was coated and dried. A release sheet was superimposed thereon to provide a transfer sheet.

| Polyacrylate 1 | 85 parts |
| --- | --- |
| Prepolymer 1 | 8 parts |
| Monomer 1 | 2 parts |
| Photopolymerization initiator | 0.15 parts |
| Photosensitizer | 0.15 parts |

The release sheet was peeled off from the transfer sheet thus obtained and the design was transferred to a ceramic substrate mug so as to bring the UV-curing adhesive layer into contact with the surface of the substrate mug. After the releasable base was peeled off, the mug was irradiated with ultraviolet rays in the same manner as in Example 1.

The thus-obtained mug carrying a polka dot pattern was excellent in bond strength and warm water resistance of the design.

The transfer sheet obtained in the example showed no problem, even after prolonged storage.

EXAMPLE 4

One-hundred parts of an epoxy resin ("Epikote 828" (trade mark), product of Yuka Shell Epoxy-K.K.), 5 parts of a reactive diluent ("Cardura" (trade mark), product of Yuka Shell Epoxy K.K.), 0.5 part of a defoaming agent ("BYK-077" (trade mark), product of BYK Chemie Japan), 40 parts of coloring pigment 2 and 30 parts of coloring pigment 4 were mixed under stirring, followed by adding 25 parts of a curing agent ("Epicure U" (trade mark), product of Yuka Shell Epoxy K.K.) and mixing to provide an ink composition.

Using the ink composition, a polka dot pattern was formed on a releasable base by screen reverse printing. The design cured at room temperature for fixation.

Then, the UV-curing adhesive composition used in Example 3 was coated and dried. A release sheet was superimposed thereon to provide a transfer sheet.

The release sheet was peeled off from the transfer sheet thus obtained and the design was transferred to a glass substrate mug in a manner to bring the UV-curing adhesive layer into contact with the surface of the glass substrate. After the releasable base was peeled off, the mug was irradiated with ultraviolet rays in the same manner as in Example 1.

The thus-obtained glass carrying a polka dot pattern was excellent in bond strength and warm water resistance of the design.

The glass carrying a polka dot pattern was pink-colored at room temperature but when filled with cold water, turned blue.

The transfer sheet obtained in the example showed no problem, even after prolonged storage.

EXAMPLE 5

Using a blue oil based ink (trade mark "Sericol PS391", product of Teikoku Ink Seizo K.K.), a polka dot pattern was formed on the releasable base by screen reverse printing and the design cured at room temperature for fixation.

Then, the UV-curing adhesive composition of the following formulation was coated and dried. A release sheet was superimposed thereon to provide a transfer sheet.

| | |
|---|---|
| Polyacrylate 2 | 90 parts |
| Prepolymer 1 | 8 parts |
| Monomer 1 | 2 parts |
| Photopolymerization initiator | 0.15 parts |
| Photosensitizer | 0.15 parts |

The release sheet was peeled off from the transfer sheet thus obtained and the design was transferred to a substrate glass in a manner to bring the UV-curing adhesive layer into contact with the surface of the substrate glass. After the releasable base was peeled off, the glass was irradiated with ultraviolet rays in the same manner as in Example 1.

The thus-obtained glass carrying a polka dot pattern was excellent in bond strength and warm water resistance of the design.

The transfer sheet obtained in the example showed no problem, even after prolonged storage.

EXAMPLE 6

A transfer sheet was manufactured in the same manner as Example 1 except that the following composition was used as the UV-curing adhesive composition and the design was transferred to a substrate mug.

| | |
|---|---|
| Polyacrylate 2 | 85 parts |
| Prepolymer 2 | 10 parts |
| Monomer 2 | 2.5 parts |
| Photopolymerization initiator | 0.1 part |
| Photosensitizer | 0.1 part |
| Adhesion imparting agent | 2.5 parts |

The thus-obtained mug carrying a polka dot pattern was excellent in bond strength and warm water resistance of the design.

The transfer sheet obtained in the example showed no problem, even after a long term storage.

EXAMPLE 7

A transfer sheet was manufactured in the same manner as Example 1 except that the following composition was used as the UV-curing adhesive composition and the design was transferred to a substrate glass.

| | |
|---|---|
| Polyacrylate 2 | 85 parts |
| Prepolymer 3 | 7.5 parts |
| Monomer 2 | 7.5 parts |
| Photopolymerization initiator | 0.2 part |
| Photosensitizer | 0.2 part |
| Silane coupling agent | 2 parts |

The thus-obtained glass carrying a polka dot pattern was excellent in bond strength and warm water resistance of the design.

The transfer sheet obtained in the example showed no problem, even after a long term storage.

EXAMPLES 8 to 12

Mugs carrying a polka dot pattern were manufactured in the same manner as Example 1 except that UV-curing adhesive compositions different in the formulation as set forth below were used.

Example 8

One part of a silane coupling agent was added to the UV-curing adhesive composition of Example 1.

Example 9

One part of a silane coupling agent was added to the UV-curing adhesive composition of Example 2.

Example 10

One part of a silane coupling agent was added to the UV-curing adhesive composition of Example 3.

Example 11

One part of a silane coupling agent was added to the UV-curing adhesive composition of Example 3.

Example 12

One part of a silane coupling agent was added to the UV-curing adhesive composition of Example 4.

Any of the thus-obtained mugs was excellent in bond strength and warm water resistance of the design. The transfer sheets obtained in these examples showed outstanding storage stability.

EXAMPLE 13

A picture pattern was formed on a substrate mug in the same manner as Example 1 except that the mug was pretreated with a 1% aqueous solution of a silane coupling agent.

The thus-obtained mug carrying a picture pattern was higher in bond strength and warm water resistance of the design than the mug obtained in Example 1.

TEST EXAMPLE 1

The mugs and glasses manufactured in the above examples and comparative examples were evaluated by the following methods in bond strength, warm water resistance, water resistance and adhesion of the designs formed thereon.

(a) Bond strength

Using a cutting knife, the design (10 mm×10 mm) on the mug was cut in longitudinal and lateral directions (cross-cut, 11 parallel lines) at 1 mm pitches to form 100 squares. An adhesive tape was applied to the cross-cut design and, then, pulled and the number of residual squares was counted.

(b) Warm water resistance

The mug carrying a transferred design was immersed in warm water at 80° C. for 30 minutes. Then, in the same manner as the bond strength test, the design was cross-cut and the number of residual squares was counted.

(c) Water resistance

The mug carrying a transferred design was immersed in water at room temperature for 24 hours. Then, in the same manner as the bond strength test, the design was cross-cut and the number of residual squares was counted.

(d) Adhesion

The mug carrying a transferred design was immersed in warm water at 80° C. for 2 hours. Then, in the same manner as the bond strength test, the picture was cross-cut and the number of residual squares was counted.

The results are shown in Table 2.

The results of Table 2 show that the picture printing layers formed on the transfer sheets manufactured according to the present invention are outstanding in bond strength, warm water resistance, water resistance and adhesion.

TABLE 2

|  | Bond strength | Resistance to warm water | Water resistance | Adhesion |
|---|---|---|---|---|
| Example 1 | 100/100 | 100/100 | 100/100 | 99/100 |
| Comparative Example 1 | 100/100 | 0/100 | 20/100 | 0/100 |
| Comparative Example 2 | 100/100 | 15/100 | 30/100 | 0/100 |
| Comparative Example 3 | 100/100 | 25/100 | 60/100 | 0/100 |
| Comparative Example 4 | 0/100 | 0/100 | 0/100 | 0/100 |
| Example 2 | 100/100 | 100/100 | 100/100 | 100/100 |
| Example 3 | 100/100 | 100/100 | 100/100 | 97/100 |
| Example 4 | 100/100 | 100/100 | 100/100 | 98/100 |
| Example 5 | 100/100 | 100/100 | 100/100 | 95/100 |
| Example 6 | 100/100 | 100/100 | 100/100 | 99/100 |
| Example 7 | 100/100 | 100/100 | 100/100 | 100/100 |
| Example 8 | 100/100 | 100/100 | 100/100 | 100/100 |
| Example 9 | 100/100 | 100/100 | 100/100 | 100/100 |
| Example 10 | 100/100 | 100/100 | 100/100 | 100/100 |
| Example 11 | 100/100 | 100/100 | 100/100 | 100/100 |
| Example 12 | 100/100 | 100/100 | 100/100 | 100/100 |
| Example 13 | 100/100 | 100/100 | 100/100 | 100/100 |

It is apparent from the results of Table 2 that the designs formed using the transfer sheets of the invention are excellent in bond strength, warm water resistance, water resistance and adhesion.

What I claim is:

1. A transfer sheet comprising a releasable base and, as disposed successively thereon, at least one picture printing layer, a UV-curing adhesive layer and a release layer, the UV-curing adhesive layer containing an alkyl (meth)acrylate polymer having a molecular weight of 300,000 to 1,000,000 and the alkyl ester moiety having 1–14 carbon atoms.

2. The transfer sheet according to claim 1 wherein the alkyl (meth)acrylate polymer has a molecular weight of 400,000 to 1,000,000 and the alkyl ester moiety has 4–12 carbon atoms.

3. The transfer sheet according to claim 1 wherein the picture printing layer comprises a UV-curing resin.

4. The transfer sheet according to claim 1 wherein the picture printing layer comprises a non-variable color layer.

5. The transfer sheet according to claim 1 wherein the picture printing layer comprises a reversible thermochromic layer.

6. The transfer sheet according to claim 1 wherein the picture printing layer comprises a non-variable color layer and a reversible thermochromic layer.

7. The transfer sheet according to any one of claims 1–6 wherein the printing layer comprises a silane coupling agent.

8. The transfer sheet according to claim 1 wherein the UV-curing adhesive layer comprises a UV-curing adhesive composition prepared using 0.1 to 15 parts by weight of a crosslinking agent or a curing agent and 10 to 70 parts by weight of a UV-curing resin per 100 parts by weight of the alkyl (meth)acrylate polymer.

9. The transfer sheet according to claim 8 wherein the UV-curing resin comprises 100 parts of a photopolymerizable prepolymer or the total amount of a photopolymerizable prepolymer and photopolymerizable monomer, and 0.3 to 20 parts of a photopolymerization initiator.

10. The transfer sheet according to claim 9 wherein the photopolymerizable prepolymer is at least one member selected from polyether (meth)acrylate, urethane (meth)acrylate, epoxy (meth)acrylate, polyester (meth)acrylate and alkyd (meth)acrylate.

11. The transfer sheet according to claim 9 wherein the photopolymerizable monomer is at least one member selected from 2-ethylhexyl (meth)acrylate, 2-hydroxyethyl (meth)acrylate, 2-hydroxy (meth)acryloyl phosphate, tetrahydrofurfuryl (meth)acrylate, (meth)acrylate of tetrafurfuryl derivative, dicyclopentenyl (meth)acrylate, dicyclopentenyloxyethyl (meth)acrylate, 1,3-butanediol (meth)acrylate, 1,4-butanediol (meth)acrylate, 1,6-hexanediol di(meth)acrylate, diethylene glycol (meth)acrylate, neopentyl glycol di(meth)acrylate, polyethylene glycol 400 di(meth)acrylate, hydroxypivalic acid ester neopentyl glycol di(meth)acrylate, tripropylene glycol di(meth)acrylate, trimethylolpropane tri(meth)acrylate, pentaerythritol tri-(meth)acrylate and dipentaerythritol hexane (meth)acrylate.

12. The transfer sheet according to claim 9 wherein the photopolymerization initiator is a radical polymerization initiator or a cationic polymerization initiator.

13. The transfer sheet according to claim 8 wherein the UV-curing adhesive composition further contains a vinyl monomer.

14. The transfer sheet according to claim 1 wherein the alkyl (meth)acrylate polymer is partially substituted by an α,β-unsaturated carboxylic acid.

15. The transfer sheet according to claim 14 wherein the α,β-unsaturated carboxylic acid is at least one member selected from (meth)acrylic acid, itaconic acid, maleic acid and fumaric acid.

16. A method for transfer printing employing a transfer sheet claimed in claim 1, which comprises peeling off the releasable base from the sheet, transferring the printing layer and UV-curing adhesive layer as a unit to a substrate and curing the adhesive layer by UV irradiation.

17. The method according to claim 1 wherein said substrate is pretreated with a silane coupling agent.

18. The method according to claim 1 wherein said printing layer contains a silane coupling agent.

* * * * *